UNITED STATES PATENT OFFICE.

GADIENT ENGI, ARMIN GROB, AND FRITZ STRAUB, OF BASEL, SWITZERLAND, ASSIGNORS TO SOCIETY OF CHEMICAL INDUSTRY IN BASLE, OF BASEL, SWITZERLAND.

PROCESS FOR PRODUCING FAST TINTS ON ANIMAL FIBERS.

1,227,406.  Specification of Letters Patent.  Patented May 22, 1917.

No Drawing. Application filed November 27, 1915. Serial No. 63,827.

*To all whom it may concern:*

Be it known that we, Dr. GADIENT ENGI, Dr. ARMIN GROB, and FRITZ STRAUB, citizens of the Swiss Republic, and residents of Basel, Switzerland, have invented a new and useful Process for Producing Fast Tints on Animal Fibers, of which the following is a full, clear, and exact specification.

We have found that the chromium compounds of azo dyestuffs containing groups able to combine with chromium, which are all saturated by chromium, as the chromium compounds of azo dyestuffs for instance obtained by digesting the corresponding azo dyestuffs with chromium oxid or its salts in aqueous solutions until the transformation is complete, or according to the process of the applications for Letters Patent Ser. No. 64023, filed November 29, 1915, and Ser. No. 112950, filed August 3, 1916, by combining chromium compounds of orthooxydiazo bodies with any component usually combined with diazo bodies for the manufacture of azo dyestuffs and treating subsequently the thus obtained half chromated orthooxyazo dyestuffs with chromium salts while in a heated condition, are eminently fit for dyeing animal fibers in an acid bath. Thereupon tints are obtained which are generally analogous to but without exception more nearly pure than those obtained by chromating subsequently the azo dyestuffs used as parent materials for the preparation of the chromium compounds. In many cases, essentially other and indeed more desirable, namely purer tints are obtained than those hitherto obtained by chromating subsequently the parent materials. Finally the chromium compounds of the dyestuffs which when applied as sodium salts were destroyed by the subsequent chromating, give according to the present process beautiful and fast dyeings. The fastness to light of the dyeings obtained according to the present invention with the chromium compounds of the specified azo dyestuffs is a very prominent one and is without exception superior to that of the dyeings obtained by subsequent chromating; in some cases, it is even increased extraordinarily. The fastness to alkali and to washing of the obtained dyeings is very good and the fastness to fulling and to potting is sufficient for the most practical uses. In many cases the fastness to fulling and to potting is equal to that of subsequently chromated dyeings. By the present process it becomes consequently possible to produce dyeings prominently fast to light and sufficiently fast to fulling and to potting for the most practical purposes, without any subsequent treatment, whereby the shading with other dyestuff classes and the obtaining of predetermined, prescribed final shades are essentially facilitated. Likewise this new process yields wools which are more open and more able to be fulled, as the noxious action of a long boiling in the chromate bath on the material falls away. Moreover copper vats may be used, since the tints of the chromium compounds are not sensitive or only very slightly sensitive to copper.

The new process shows therefore a considerable technical progress in several respects. The prominent fitness of the characterized chromium compounds for the production of fast dyeings on animal fibers became known only by the present invention. Their use for the specified purpose is illustrated by the following example:

The goods are dyed with 1–3% dyestuff (chromium compound) 10% crystallized sodium sulfate, 3–5% acetic acid of the specific gravity of 1.0523 (or the equivalent quantity of formic acid or of sulfuric acid), the goods being introduced into the bath at 50 to 60° C., the bath slowly heated to boiling and the goods dyed in the boiling bath for ¾ of an hour to 1 hour.

The following tabular exhibit illustrates the use of a certain number of chromium compounds according to the present process:

| Diazo derivate of— | Combined with— | Dyeings of the sodium salt. | | Dyeings of the chromium compound from an acid bath. |
|---|---|---|---|---|
| | | From an acid bath. | Subsequently chromated. | |
| | | 1. | 2. | 3. |
| (structure: OH, NH₂, NO₂ on benzene) | 1:8-Aminonaphthol-3:6-disulfonic acid. | Red-violet | Green | Green (a little bluer and purer than 2). |
| " | 1:8-Aminonaphthol-2:4-disulfonic acid. | Violet | Blue-green | Green. |
| " | m-Phenylendiamin-sulfonic acid. | Brown-orange | Brown | Brown. |
| " | 1:5-Naphtholsulfonic acid | Dull violet-brown | Black-brown | Black-brown. |
| " | Orthocarboxylated benzoylacetic acid. | Black-brown | Olive-green | Olive-green. |
| (structure: OH, NH₂, SO₃H on benzene) | Beta-naphthol | Red-brown | Dull-violet | Violet (purer and bluer than 2). |
| " | 3-Oxy-1-thionaphthene | Orange | Gray (mostly destroyed) | Blue-black. |
| " | Dicetohydroinden | Orange | Red-brown | Red-brown. |
| (structure: OH, NH₂, SO₃H on benzene) | 2:5-Aminonaphthol-7-sulfonic acid. | Red-brown | Violet | Violet. |
| " | m-Phenylendiamin | Red-brown | Yellow-brown | Yellow-brown. |
| (structure: OH, NH₂, SO₃H, CH₃ on benzene) | Oxythionaphthene | Orange-brown | Gray (destroyed) | Black-blue. |
| (structure: OH, NH₂, NO₂, CH₃ on benzene) | Orthocarboxylated benzoylacetic acid. | Brown-olive | Olive-black | Olive. |

| Diazo derivate of— | Combined with— | Dyeings of the sodium salt. | | Dyeings of the chromium compound from an acid bath. |
| --- | --- | --- | --- | --- |
| | | From an acid bath. | Subsequently chromated. | |
| | | 1. | 2. | 3. |
| 2,4-dinitro-6-aminophenol (OH, NO₂, NH₂, NO₂ on benzene ring) | 1:8-Aminonaphthol-2:4-disulfonic acid. | Blue-black | Yellowish green | Yellowish green. |
| " | 1:8-Aminonaphthol-4-sulfonic acid. | Black-violet | Yellowish green | Yellowish green. |
| " | Parakresolsulfonic acid | Yellow-brown | Brown | Brown. |
| " | Orthocarboxylated benzoylacetic acid. | Brown | Brown-olive (partly destroyed). | Green-olive. |
| 4-chloro-2-aminophenol (OH, NH₂, Cl on benzene ring) | 1:8-Dioxynaphthalene-3:6-disulfonic acid. | Bordeaux-red | Blue | Blue. |
| " | Orthocarboxylated benzoylacetic acid. | Dull bordeaux | Destroyed | Pure yellowish green. |
| 3-carboxy-5-nitro-2-aminophenol (COOH, OH, NH₂, NO₂ on benzene ring) | Betanaphthol | Red | Bordeaux | Bordeaux. |
| " | 1:8-Aminonaphthol-3:6-disulfonic acid. | Reddish-violet | Blue-black | Reddish-blue. |
| " | 1:8-Naphthylaminsulfonic acid. | Red | Yellow-brown | Red-brown. |
| " | 1:8-Aminonaphthol-2:4-disulfonic acid. | Violet | Blue-violet | Greenish-blue. |
| " | Resorcinol | Yellow-brown | Red-brown | Pure red-brown. |
| " | Beta-oxynaphthoic acid | Brown-red | Corinth | Corinth. |
| 3-carboxy-5-sulfo-2-aminophenol (COOH, OH, NH₂, SO₃H on benzene ring) | Acetacetic anilid | Pure-yellow | Lemon-yellow | Lemon-yellow. |

| Diazo derivate of— | Combined with— | Dyeings of the sodium salt. | | Dyeings of the chromium compound from an acid bath. |
|---|---|---|---|---|
| | | From an acid bath. | Subsequently chromated. | |
| | | 1. | 2. | 3. |
| [Structure: benzene ring with OH, NH₂, COOH, Cl substituents] | 1:8-Aminonaphthol-3:6-disulfonic acid. | Blue-violet | Dull-green | Pure-green-blue. |

| Diazo derivate of— | Combined with— | Dyeings of the sodium salt. | | Dyeings of the chromium compound. |
|---|---|---|---|---|
| | | From an acid bath. | Subsequently chromated. | |
| | | 1. | 2. | 3. |
| [Structure: benzene ring with OH, NH₂, COOH, Cl substituents] | 1:8-Aminonaphthol-2:4-disulfonic acid. | Red-violet | Blue | Vivid-blue. |
| " | 2:5-Aminonaphthol-7-sulfonic acid. | Red | Red-violet | Blue-red. |
| " | 1:4-Naphtholsulfonic acid | Red | Violet | Violet. |
| " | 1-Phenyl-3-methyl-5-pyrazolonesulfonic acid. | Orange-yellow | Reddish-orange | Reddish-orange. |
| [Structure: naphthalene with NH₂, OH, SO₃H] | Nitro-1-phenyl-3-methyl-5-pyrazolone. | Red-brown | Bluish-red | Bluish pure red (much purer than 2). |
| " | Alphanaphthol | Black-violet | Blue-black | Black-blue (purer than 2). |
| " | Betanaphthol | Violet-bordeaux | Blue | Pure blue (much purer than 2). |
| " | Resorcinol | Red-brown | Gray-violet | Violet. |
| " | 3-Oxy-1-thionaphthene | Dull-blue-red | Partly destroyed | Greenish-blue. |
| " | Diketohydroindene | Red-brown | Destroyed | Prune. |
| " | Perinaphthindandione | Red-brown | Dark-brown | Dark-brown. |

| The following body— | Combined with— | Dyeings of the sodium salt. | | Dyeings of the chromium compound. |
| --- | --- | --- | --- | --- |
| | | From an acid bath. | Subsequently chromated. | |
| | | 1. | 2. | 3. |
| 1 molecule [diazobenzene structure] | 1 molecule 1:8:4:6-aminonaphthol-disulfonic acid and 1 molecule [dinitro-diazo-phenol structure] | Blue-green | Green | Yellow-green. |
| [bis-azo naphthol sulfonic acid structure] | 2 molecules betanaphthol | Black-brown | Black | Blue-black. |
| " | 2 molecules 2:6-naphtholsulfonic acid. | Violet-black | Black | Blue-black. |
| [naphthol sulfonic diazo structure] | 1 molecule [phenol-diazo structure] and 1 molecule resorcinol. | Violet | Black-green | Black-green. |

What we claim is:

The described process for producing fast tints on animal fibers, consisting in dyeing the same in an acid bath with chromium 5 compounds of azo dyestuffs containing groups able to combine with chromium and which have been combined with chromium.

In witness whereof we have hereunto signed our names this 30th day of October, 1915, in the presence of two subscribing 10 witnesses.

DR. GADIENT ENGI.
DR. ARMIN GROB.
FRITZ STRAUB.

Witnesses:
ARNOLD ZUBER,
AMAND RITTER.